United States Patent Office 3,012,002
Patented Dec. 5, 1961

3,012,002
PROCESS FOR QUATERNIZATION OF HETEROCYCLIC NITROGEN BASE POLYMERS WITH SULFONIUM HALIDES AND PRODUCTS PRODUCED THEREBY
Paul W. Solomon, Bartlesville, Okla., assignor to Phillips Petroleum Company, a corporation of Delaware
No Drawing. Filed Jan. 24, 1958, Ser. No. 710,866
20 Claims. (Cl. 260—45.5)

This invention relates to an improved process of quaternization and products produced thereby.

Quaternization of polymers of polymerizable heterocyclic nitrogen bases, such as polymers of 2-methyl-5-vinylpyridine, is well known. The process and a particular application thereof is described in Pritchard et al. 2,751,323 (1956), and fully disclosed and claimed in a copending application of Pritchard, application Serial No. 588,957, filed June 4, 1956, now abandoned. A problem has been observed when volatile, generally low molecular weight, quaternizing agents are used. When such materials are use in the process, the high volatility results in an appreciable loss of the quarternizing agent during mixing and cure, it being pointed out that the quaternization reaction requires a considerable amount of time for its completion. The present invention relates to the quaternization of such polymers by a method wherein loss of the volatile quaternizing agent is substantially eliminated.

Therefore the following are objects of my invention.

An object of my invention is to provide an improved process of quaternization. A further object of my invention is to provide a quaternizing process wherein loss of volatile quaternizing agents is substantially eliminated. A further object of my invention is to provide a quaternization process utilizing sulfonium halides. A further object of my invention is to provide a new type of quaternized product.

Other objects and advantages of my invention will be apparent to one skilled in the art upon reading this disclosure.

Broadly, my improved process comprises quaternizing polymers of polymerizable heterocyclic nitrogen bases selected from the group consisting of vinyl and isopropenyl substituted pyridines and quinolines, the improvement comprising adding to the polymer a sulfonium halide wherein the halogen is selected from the group consisting of chlorine, bromine, and iodine and heating the resulting mixture. The sulfonium compounds are prepared by reacting an organic halide with an organic sulfide or disulfide. The sulfonium salts are solids which can be blended with the polymer on a mill or by other convenient means such as, for example, a Banbury. When these compounds are used there is substantially no loss of quaternizing agent during mixing and cure.

As stated, the invention is applicable to polymers of polymerizable heterocyclic nitrogen bases. More specifically, these heterocyclic nitrogen bases are those of the pyridine, quinoline, and isoquinoline series which contain a single

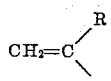

substituent where R is either hydrogen or a methyl group. That is, the substituent is either a vinyl or an alpha-methylvinyl group. Of these, the compounds of the pyridine series are of the greatest interest commercially at present. Various substituted derivatives are applicable but the total number of carbon atoms in the groups attached to the carbon atoms of the heterocyclic nucleus in addition to vinyl or alpha-methylvinyl group should not be greater than twelve because of the polymerization rate decreases somewhat with increasing size of the alkyl group. Compounds where the alkyl substituents are methyl and/or ethyl are available commercially. These heterocyclic nitrogen bases have the formula

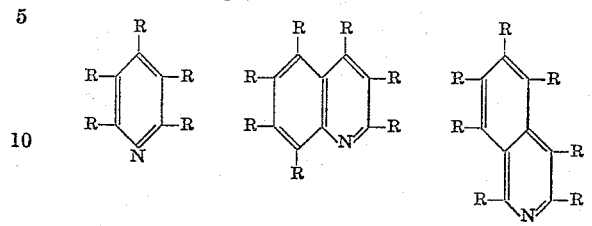

where R is selected from the group consisting of hydrogen, alkyl, vinyl, alpha-methylvinyl, alkoxy, halo, hydroxy, cyano, aryloxy, aryl, and combinations of these groups such as haloalkyl alkylaryl, hydroxyaryl, and the like; one and only one of said groups being selected from the group consisting of vinyl and alpha-methylvinyl; and the total number of carbon atoms in the nuclear substituted groups, in addition to the vinyl or alpha-methylvinyl group, being not greater than twelve. Examples of such compounds are 2-vinylpyridine; 4-vinylpyridine; 2-vinyl-5-ethylpyridine; 2-methyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,3-dimethyl-5,6-dipentyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dicholropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxy-8-methylisoquinoline; and the like.

While homopolymers can be quaternized by my process, of greater value are quaternized copolymers of these polymerizable heterocyclic nitrogen bases. A particularly valuable group of copolymers are prepared by polymerizing the major amount of a conjugated diene with a minor amount of the polymerizable heterocyclic nitrogen base.

Preferred conjugated dienes are those containing 4 to 8 carbon atoms although dienes containing up to 12 carbon atoms can be used. Examples of these dienes include 1,3-butadiene, isoprene, 2-methyl-1,3-butadiene, 2,3-dimethyl-1,3-butadiene, 2,3-dimethyl-1,3-hexadiene, 2-methyl-4-isopropyl-1,3-octadiene, etc. Various alkoxy, such as methoxy and ethoxy, cyano, and halo-derivatives of these conjugated dienes, are also applicable. Such dienes include, by way of example, 2-methoxy-3-ethylbutadiene, 2-methoxy-3-ethyl-1,3-pentadiene, 2-ethoxy-1,3-butadiene, 2-cyano-1,3-butadiene, 2-chloro-1,3-butadiene, etc.

Also useful are copolymers of the polymerizable nitrogen bases with other polymerizable monomers, either for the production of copolymers or terpolymers with the above-mentioned conjugated dienes. These additional monomers are well known in the art and include, for example, styrene, para-chlorostyrene, para-methoxystyrene, alpha-methylstyrene, vinylnaphthalene, acrylic acid, methacrylic acid, methyl acrylate, ethyl acrylate, methyl alpha-chloroacrylate, methyl methacrylate, ethyl methacrylate, butyl methacrylate, methyl ethacrylate, methacrylonitrile, methacrylamide, methyl isopropenyl ketone, methyl vinyl ketone, methyl vinyl ether, vinyl acetate, vinyl chloride, and vinylidene chloride.

The sulfonium compounds are prepared by reacting an organic halide with a sulfide or disulfide, the halides being chlorides, bromides, or iodides. Preferred halides are the lower alkyl and alkenyl halides having 1 to 6, inclusive, carbon atoms per molecule. Examples of suitable organic halides which can be reacted with the organic sulfides include methyl chloride, ethyl chloride, 1-chloropropane, 1-chlorobutane, 1-chloro-2-methylpropane, 1-chloropentane, 1-chlorohexane, 1-chloro-2-methylpentane, 1-chloro-3-methylpentane, chloroethylene, 4-chloro-1-butene, 4-chloro-2-methyl-1-butene, 4-chloro-2-butene, 5-chloro-1-pentene, 5-chloro-3-methyl-1-pentene, methyl bromide, 1-bromopropane, 1-bromo-2-methylpropane, 1-bromohexane, 1-bromo-3-methylpentane, 4-bromo-1-butene, 4-bromo-2-butene, 5-bromo-3-methyl-1-pentene, ethyl iodide, 1-iodobutane, 1-iodopentane, 1-iodo-2-methylpentane, iodoethylene, 4-iodo-2-methyl-1-butene, and 5-iodo-1-pentene.

The sulfides and disulfides, represented by the formula R—S—R and R—SS—R can be symmetrical or unsymmetrical compounds and preferably contain not more than about 30 carbon atoms. The R group can be the same as the organic radical associated with the halide, i.e., an alkyl or alkenyl radical. However, more broadly, the R group can be aliphatic, aralkyl, or cycloalkyl group. Examples of such groups are ethyl, propyl, butyl, hexyl, octyl, dodecyl, allyl, crotyl, hexenyl, dodecenyl, benzyl, 3-naphthylbutyl, 2-phenylethyl, cyclohexyl and cyclopentyl. Specific compounds having such groups include tertiary-butyl sulfide, allyl sulfide, benzyl sulfide, octyl sulfide, octyl decyl sulfide, dodecyl sulfide, pentadecyl sulfide, 2-phenylethyl sulfide, cyclohexyl sulfide, cyclopentyl sulfide, 3-naphthylbutyl sulfide, ethyl disulfide, butyl disulfide, octyl disulfide, allyl disulfide, hexenyl disulfide, benzyl disulfide, 2-phenylethyl disulfide, cyclopentyl disulfide, and naphthyl eicosyl disulfide.

In addition to the relatively low molecular weight sulfides and disulfides described above, polymeric thioethers can be prepared and reacted with the organic halide. Suitable polymeric thioethers can be prepared by reaction of polymers containing epoxy oxygen atoms

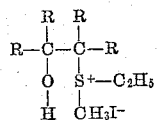

with a thiol. The epoxidized polymers, as is known, can be prepared by epoxidation of ethylenically unsaturated polymers prepared with 1,3-butadiene and its homologues or copolymers of 1,3-butadiene with copolymerizable monomers such as styrene. The thiols which can be reacted with such epoxy-containing polymers comprise the aliphatic thiols, commonly those having one to about 16 carbon atoms. Examples of thiols include methyl, ethyl, propyl, isopropyl, isopropenyl, hexenyl, octyl, dodecyl, heptadecenyl, and hexadecyl thiol.

The Epon polymers can also be reacted with these thiols. Epon polymers are commercial condensation products of Bis Phenol-A (para,para'-isopropylidenediphenol) with epichlorohydrin. Typical Epon polymers have an epoxide equivalent weight in the range of 60 to 4000. For example, Epon 562 is a liquid resin having an epoxide equivalent weight of 140–165.

The following is a list of sulfonium compounds which can be employed. This list is not intended to be exhaustive but illustrates the scope of products which are applicable; trimethyl sulfonium iodide, trimethyl sulfonium bromide, trimethyl sulfonium chloride, ethyl dimethyl sulfonium iodide, ethyl dimethyl sulfonium bromide, ethyl dimethyl sulfonium chloride, triethyl sulfonium iodide, triethyl sulfonium bromide, triethyl sulfonium chloride, tripropyl sulfonium iodide, tripropyl sulfonium bromide, tripropyl sulfonium chloride, dimethyl octyl sulfonium iodide, dimethyl octyl sulfonium bromide, dimethyl octyl sulfonium chloride, tridodecyl sulfonium iodide, tridodecyl sulfonium bromide, tridodecyl sulfonium chloride, methyl dioctyl sulfonium iodide, methyl dioctyl sulfonium chloride, dimethyl dodecyl sulfonium iodide, dimethyl dodecyl sulfonium bromide, dimethyl dodecyl sulfonium chloride, allyl diethyl sulfonium iodide, allyl diethyl sulfonium bromide, allyl diethyl sulfonium chloride, cyclopropyl dimethyl sulfonium iodide, cyclopropyl dimethyl sulfonium bromide, cyclopropyl dimethyl sulfonium chloride, cyclohexyl dimethyl sulfonium iodide, cyclohexyl dimethyl sulfonium bromide, cyclohexyl dimethyl sulfonium chloride, dimethyl benzyl sulfonium iodide, dimethyl benzyl sulfonium bromide, dimethyl benzyl sulfonium chloride, dihexyl benzyl sulfonium iodide, dihexyl benzyl sulfonium bromide, dihexyl benzyl sulfonium chloride, diethyl hexenyl sulfonium iodide, diethyl hexenyl sulfonium bromide, diethyl hexenyl sulfonium chloride, butenyl diethyl sulfonium iodide, butenyl diethyl sulfonium bromide, butenyl diethyl sulfonium chloride and polymeric compounds obtained by reacting epoxidized polybutadiene or an Epon polymer with one of the above thiols, such as methyl thiol, and subsequently with a halide, such as ethyl iodide, and containing the structure.

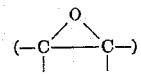

where the R's represent the rest of the polymer molecule.

These sulfonium salts are incorporated into the polymer by mixing on a mill or any other suitable means such as a screw masticator. The amount of quaternizing agent is sufficient to provide the degree of quaternization desired. As pointed out in Pritchard, Serial No. 588,957, filed June 4, 1956, now abandoned, desirable products can be made by quaternizing only a portion of the nitrogen atoms present in the polymer. However, where complete reaction is desired, it is common to use an excess. More specifically, the amount of the sulfonium compound used should provide between 0.2 and 2 mols of the quaternizing agent per mol of reactive nitrogen in the polymer.

Obviously, other compounding ingredients used in rubber practice can be used. Carbon black or mineral fillers can be blended with the polymer before or simultaneously with the sulfonium salt. Suitable material fillers include silica, clay, magnesia, and the like. The temperature of cure depends upon many factors including the amount of nitrogen in the polymer, the amount of sulfonium compound used, and the presence or absence of other materials. Rapid rates of cure are not obtained until the material is heated to a temperature of at least about 150° F. Temperatures of at least 200° F. are generally used. Temperatures up to 500° F. can be used. The time of cure is dependent upon the temperature used, the cure being much more rapid when temperatures in the upper part of the range are used. A time of 10 to 120 minutes is generally satisfactory although, in some cases, far longer times are used, the specific times being easily determined by one skilled in the art from a preliminary series of runs using different times, the preferred time being determined by the products desired.

Production of the sulfonium halide is not difficult, the reaction between a sulfide and halide progressing at room temperature by letting the materials stand in contact. An acidic catalyst, such as sulfuric acid, can be used to accelerate the rate of reaction if desired.

For instance, a mixture of 18 grams of ethyl sulfide and 57.2 grams of methyl iodide, to which was added a trace of ethanol (one or two drops), was allowed to stand at room temperature for 16 hours. Unreacted methyl iodide was removed under reduced pressure.

The reaction mixture, a syrupy mass, was extracted several times with cyclohexane, separating the cyclohexane extract by decantation. Crystallization of the product was noted when cyclohexane was added and continued through the extraction process. The crystalline product, after decanting the last portion of cyclohexane, was placed under vacuum for several hours at room temperature to remove residual cyclohexane after which a portion was submitted for analysis. The product had a melting point of 38.5–39.5° C. (101–103° F.). Analytical data, compared with theoretical values for methyl diethyl sulfonium iodide, are shown below.

|  | Calculated | Found |
| --- | --- | --- |
| Carbon | 25.9 | 25.9 |
| Hydrogen | 5.6 | 5.7 |
| Sulfur | 13.8 | 14.2 |
| Iodine | 54.6 | 54.2 |

The following examples illustrate the production of the products of my invention but the specific details given should not be considered as unduly limiting.

EXAMPLE I

For this example, a rubbery polymer of approximately 50 Mooney (ML-4) was prepared by emulsion polymerization at 41° F. using the following recipe.

| | Parts by weight |
| --- | --- |
| Water | 230 |
| 1,3-butadiene | 75 |
| 2-methyl-5-vinylpyridine | 25 |
| Potassium fatty acid soap | 6 |
| KCl | 0.5 |
| Tamol N[1] | 0.3 |
| Sodium formaldehyde sulfoxylate | 0.1 |
| $FeSO_4 \cdot 7H_2O$ | 0.04 |
| Ethylene diamine tetraacetic acid | 0.06 |
| p-Menthane hydroperoxide | 0.1 |
| Tertiary dodecyl mercaptan | 0.22 |
| Shortstop (Goodrite 3955[2]) | 0.15 |
| Antioxidant (BLE[3]) (percent based on polymer) | 1.25 |

[1] Sodium salt of naphthenic sulfonic acid condensed with formaldehyde.
[2] 50/50 mixture of sodium dimethyldithiocarbamate and sulfur in the form of sodium polysulfide.
[3] High temperature reaction product of diphenylamine and acetone.

For the sulfonium compound, a salt of methyl iodide with diethyl sulfide was prepared by allowing a mixture of 0.2 mol of the sulfide and 0.4 mol of the iodide to stand overnight. The product was recovered and purified as set forth above, the product being orange hygroscopic crystals melting at 39–39.5° C. (102–103° F.)

A product was made by mixing 100 parts of the butadiene/2-methyl-5-vinylpyridine copolymer with 50 parts of high abrasion carbon black (Philblack O) 10 parts of Circo Para, and 23.3 parts of the methyl diethyl sulfonium iodide. Circo Para is a mixture of equal parts of Circosol-2XH with Paraflux, Circosol-2XH being a petroleum hydrocarbon softener containing hydrocarbons of high molecular weight, in the form of a heavy, viscous, transparent, pale green, odorless liquid of low volatility, a specific gravity of 0.940, and a Saybolt Universal viscosity at 100° F. of about 2000 seconds, and Paraflux being a saturated polymerized hydrocarbon.

Physical properties of the material were determined after curing the mixture for 45 minutes at 240° F. The material had a 300 percent modulus of 1000 p.s.i., a tensile strength of 2200 p.s.i. and an elongation of 500 percent, these results showing that a satisfactory cure was obtained.

EXAMPLE II

A butadiene/2-methyl-5-vinylpyridine copolymer was prepared according to the recipe of Example I except that the monomer ratio was 85 parts of butadiene to 15 parts of 2-methyl-5-vinylpyridine.

A high molecular weight sulfide was prepared by reacting 150 grams of Epon Resin 562 with 100 grams of ethyl mercaptan using 3 drops of concentrated sulfuric acid as catalyst. This epoxy type resin is a liquid polymer prepared from a bisphenol and epichlorohydrin. The epoxide equivalent weight is in the range of 140–165. After 7 days' reaction at room temperature (about 75° F.), the excess mercaptan was removed by distillation in vacuo. To prepare the methyl iodide salt of the sulfide, 170 grams of methyl iodide was added, the mixture allowed to stand for 2 more days at room temperature, and the excess iodide removed in vacuo. The product was a viscous brown syrup analyzing 34 percent methyl iodide. It was quite soluble in 25 percent methanol.

This material was compounded in the following recipes.

| | |
| --- | --- |
| Copolymer | 100 |
| Carbon black (Philblack O) | 0 or 50 |
| Epon 562 bis-sulfide-$CH_3I$ salt | Variable |

The results of tests with this polymer are reported in the following Table I. Since in the absence of quaternizing agents the vinylpyridine polymer develops no tensile strength, these data show the utility of the quaternizing agent prepared with the Epon resin.

High values for the tensile strength and modulus are obtained over a wide range of cure conditions.

Table I

PHYSICAL PROPERTIES OF POLYMER CURED WITH THE EPOXY DERIVED QUATERNIZING AGENT

| Carbon Black, phr. | Epoxy derived quat. agent, phr. | Cure Time, Min. or days | Cure temperature, °F. | 300% Modulus, p.s.i. | Tensile, p.s.i. | Elongation, percent |
| --- | --- | --- | --- | --- | --- | --- |
| | 14 | 30 minutes | 307 | | 350 | 370 |
| | 28 | do | 307 | | 500 | 310 |
| | 42 | do | 307 | | 550 | 390 |
| 62 | 14 | 45 days | 80 | 810 | 1,010 | 380 |
| 62 | 14 | 30 minutes | 220 | 740 | 1,060 | 470 |
| 62 | 14 | do | 250 | 800 | 1,080 | 480 |
| 62 | 14 | do | 280 | 1,050 | 1,330 | 420 |
| 62 | 14 | do | 307 | 1,010 | 1,110 | 420 |
| 63 | 28 | 45 days | 80 | 890 | 1,030 | 340 |
| 63 | 28 | 30 minutes | 220 | 1,020 | 1,380 | 380 |
| 63 | 28 | do | 250 | 1,100 | 1,420 | 430 |
| 63 | 28 | do | 280 | 1,540 | 1,850 | 370 |
| 63 | 28 | do | 307 | 1,440 | 1,830 | 400 |
| 64 | 42 | 45 days | 80 | 970 | 1,220 | 360 |
| 64 | 42 | 30 minutes | 220 | 1,110 | 1,590 | 420 |
| 64 | 42 | do | 250 | 1,330 | 1,850 | 410 |
| 64 | 42 | do | 280 | 1,470 | 2,060 | 400 |
| 64 | 42 | do | 307 | 1,470 | 2,020 | 410 |

The results wherein no carbon black was used are highly significant in that they show cure of the gum stock. In the absence of the sulfonium compound or other curatives, and under the same conditions, the tensile strength of the polymer is less than 100 p.s.i. and the elongation is very high, generally greater than 1000 percent.

As many possible embodiments can be made of this invention without departing from the scope thereof, it is to be understood that all matter herein set forth is to be interpreted as illustrative and not as unduly limiting the invention.

I claim:

1. In the production of solid polymeric organic products by the quaternization of a polymer of a polymerizable heterocyclic nitrogen base selected from the group consisting of vinyl and isopropenyl substituted pyridines and quinolines, the recited substituent group being attached to a carbon atom in a ring of the heterocyclic nitrogen base, the improvement comprising adding a sulfonium halide wherein the halogen is selected from the group consisting of chlorine, bromine, and iodine, said sulfonium halide being the reaction product of an aliphatic halide of 1 to 6 carbon atoms and a compound selected from the group consisting of (1) sulfides prepared by reacting a polymer containing a plurality of

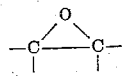

groups with an aliphatic thiol containing 1 to 16 carbon atoms and (2) compounds selected from the group consisting of R—S—R and R—S—S—R where the R groups are individually selected from the group consisting of aliphatic, aralkyl and cycloalkyl groups, and heating the mixture to cure the same.

2. The process of claim 1 wherein said sulfonium compound is diethyl methyl sulfonium iodide.
3. The process of claim 1 wherein said sulfonium compound is trimethyl sulfonium iodide.
4. The process of claim 1 wherein said sulfonium compound is dimethyl ethyl sulfonium iodide.
5. The process of claim 1 wherein said sulfonium compound is triethyl sulfonium iodide.
6. The process of claim 1 wherein said sulfonium compound is the reaction product of methyl iodide and a sulfide, said sulfide being the reaction product of an epoxy resin containing a plurality of

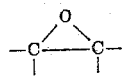

groups and ethyl mercaptan.

7. In the production of solid polymeric organic products by the quaternization of a copolymer of 2-methyl-5-vinyl pyridine and 1,3-butadiene, the improvement comprising adding a sulfonium halide wherein the halogen is selected from the group consisting of chlorine, bromine, and iodine, said sulfonium halide being the reaction product of an aliphatic halide of 1 to 6 carbon atoms and a compound selected from the group consisting of (1) sulfides prepared by reacting a polymer containing a plurality of

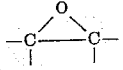

groups with an aliphatic thiol containing 1 to 16 carbon atoms and (2) compounds selected from the group consisting of R—S—R and R—S—S—R where the R groups are individually selected from the group consisting of aliphatic, aralkyl and cycloalkyl groups, and heating the mixture to cure the same.

8. In the production of solid polymeric organic products by the quaternization of a copolymer of 2-vinylpyridine and 1,3-butadiene, the improvement comprising adding a sulfonium halide wherein the halogen is selected from the group consisting of chlorine, bromine, and iodine, said sulfonium halide being the reaction product of an aliphatic halide of 1 to 6 carbon atoms and a compound selected from the group consisting of (1) sulfides prepared by reacting a polymer containing a plurality of

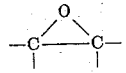

groups with an aliphatic thiol containing 1 to 16 carbon atoms and (2) compounds selected from the group consisting of R—S—R and R—S—S—R where the R groups are individually selected from the group consisting of aliphatic, arlkyl and cycloalkyl groups, and heating the mixture to cure the same.

9. In the production of solid polymeric organic products by the quaternization of a copolymer of 5-ethyl-2-vinylpyridine and 1,3-butadiene, the improvement comprising adding a sulfonium halide wherein the halogen is selected from the group consisting of chlorine, bromine, and iodine, said sulfonium halide being the reaction product of an alphatic halide of 1 to 6 carbon atoms and a compound selected from the group consisting of (1) sulfides prepared by reacting a polymer containing a plurality of

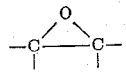

groups with an aliphatic thiol containing 1 to 16 carbon atoms and (2) compounds selected from the group consisting of R—S—R and R—S—S—R where the R groups are individually selected from the group consisting of aliphatic, aralkyl and cycloalkyl groups, and heating the mixture to cure the same.

10. In the production of solid polymeric organic products by the quaternization of a copolymer of 2-methyl-5-vinylpyridine and 1,3-butadiene, the improvement comprising adding diethyl methyl sulfonium iodide to said polymer and heating the mixture at a temperature of 200 to 500° F.

11. In the production of solid polymeric organic products by the quaternization of a copolymer of 2-methyl-5-vinylpyridine and 1,3-butadiene, the improvement comprising adding the reaction product of methyl iodide and a sulfide, said sulfide being the reaction product of an epoxy resin containing a plurality of

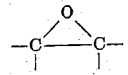

groups and ethyl mercaptan, and curing the mixture at a temperature of 200 to 500° F.

12. The product produced by the process of claim 1.
13. The product produced by the process of claim 10.
14. The product produced by the process of claim 11.
15. The process of claim 1 wherein said sulfonium compound is used in an amount to provide between 0.2 and 2 mols of the quaternizing agent per mol of reactive nitrogen in the polymer.
16. The process of claim 10 wherein 0.2 to 2 mols of said iodide are used per mol of reactive nitrogen in the polymer.
17. The process of claim 11 wherein 0.2 to 2 mols of said reaction product are used per mol of reactive nitrogen in the polymer.
18. The process of claim 11 wherein said epoxy resin is an epoxidized polymer of 1,3-butadiene.
19. The process of claim 11 wherein said epoxy resin is the reaction product of a bisphenol and epichlorohydrin.
20. In the production of solid polymeric organic products by the quaternization of a polymer of a polymerizable heterocyclic nitrogen base selected from the group consisting of vinyl and isopropenyl substituted pyridines and quinolines, the recited substituent group being attached to a carbon atom in a ring of the heterocyclic nitrogen base, the improvement comprising adding a sulfonium halide wherein the halogen is selected from the group consisting of chlorine, bromine, and iodine, said sulfonium halide being the reaction product of an aliphatic halide of 1 to 6 carbon atoms and an aliphatic sulfide, and heating the mixture to cure the same.

References Cited in the file of this patent
UNITED STATES PATENTS

| | | |
|---|---|---|
| 2,121,823 | Piggott | June 28, 1938 |
| 2,484,430 | Sprague | Oct. 11, 1949 |
| 2,860,117 | Pritchard et al. | Nov. 11, 1958 |
| 2,888,436 | Pritchard | May 26, 1959 |